April 7, 1936.                H. C. DRAKE                2,036,856
                      RAIL FLAW DETECTOR MECHANISM
                           Filed May 7, 1932
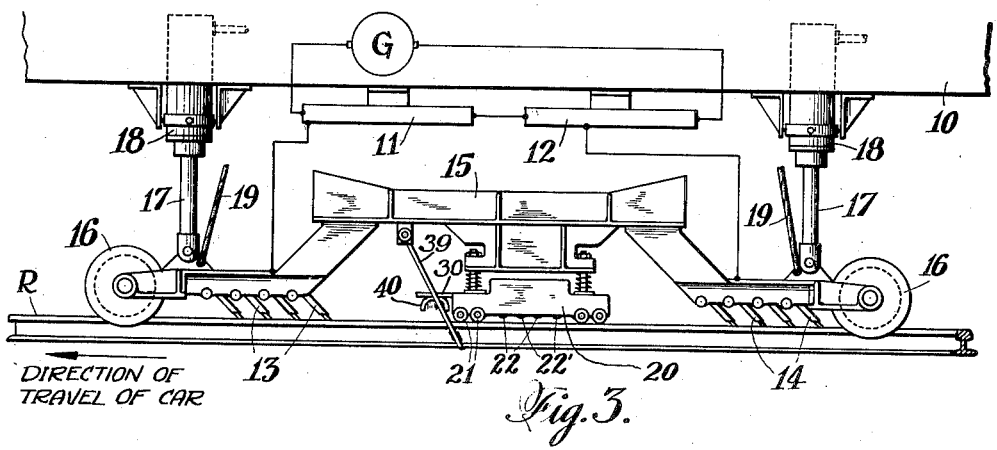
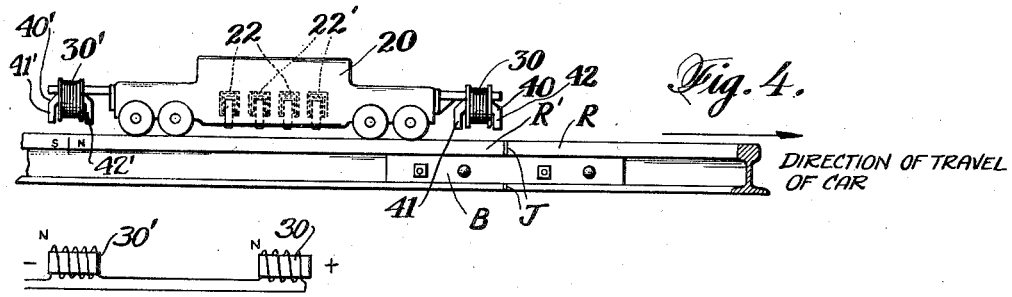
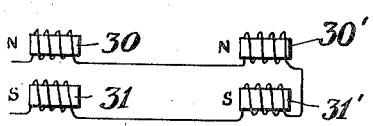
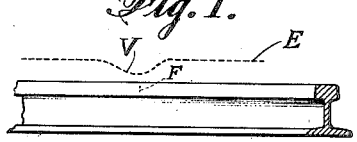
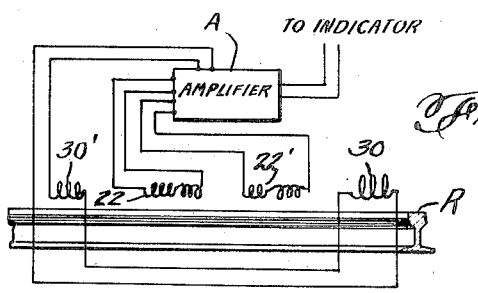
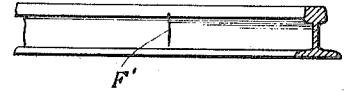
INVENTOR
Harcourt C. Drake
BY
Joseph H. Lipschutz
ATTORNEY Patented Apr. 7, 1936

2,036,856

UNITED STATES PATENT OFFICE 2,036,856

RAIL FLAW DETECTOR MECHANISM

Harcourt C. Drake, Hempstead, N. Y., assignor to Sperry Products, Inc., Brooklyn, N. Y., a corporation of New York Application May 7, 1932, Serial No. 609,793

21 Claims. (Cl. 175—183)

This invention relates to rail flaw detector mechanism of the type employed in the Sperry rail flaw detector cars. The system therein employed consists in passing a heavy current through the rail to establish an electromagnetic field and detecting any variations in this field due to presence of internal fissures by means of induction coils which are moved through the field thus established to cut the lines of force and induce E. M. F.'s. The coils are arranged in opposed pairs in tandem so that first one and then the other of the coils will enter a region of flaw to cut a different number of lines of force from the other coil, thus generating a differential E. M. F. which may then be amplified and caused to actuate any suitable indicator such as a recorder.

It has been found, however, that occasionally very large fissures extending substantially across the entire head of the rail, as well as fissures that have "cracked out", that is, internal fissures that extend to the very surface, have yielded such weak responses that they have failed to come through on the record.

It is the principal object of my invention, therefore, to provide a method of and means for detecting such large fissures as may heretofore have been missed.

Further objects and advantages of my invention will become apparent in the following detailed description thereof.

In the accompanying drawing,

Figs. 1 and 2 are diagrammatic representations of the theory responsible for my invention.

Fig. 3 is a side elevation of a portion of a Sperry rail flaw detector car showing the rail flaw detector mechanism suspended therefrom.

Fig. 4 is an enlarged view of the search unit of Fig. 3 showing a somewhat modified form of my invention.

Fig. 5 is a wiring diagram showing the connections between certain of the coils of Fig. 4.

Fig. 6 is a wiring diagram similar to Fig. 5 but illustrating a modified form of my invention.

Figure 7 is a wiring diagram illustrating the connections between the various induction coils.

Referring to Fig. 3 of the drawing, I have shown the Sperry rail flaw detector car as comprising car-body 10, only a portion of which is shown, within which is mounted a generator G for supplying current to the rail R. Said current may be supplied by way of bus-bars 11 and 12 and sets of brushes 13, 14 in engagement with the rail, said brushes being carried by a current brush carriage 15 adapted to ride on the rail by means such as wheels 16. The current brush carriage may be lowered by means such as piston rods 17 attached to pistons operating within fluid pressure cylinders 18 mounted on the car-body so that when fluid pressure is applied the piston rods move outwardly from the cylinders to lower the current brush carriage 15. When the air pressure is removed said carriage may be raised to elevated position by means such as cables 19 and springs not shown. For detecting flaws, there is provided a search unit in the form of a detector carriage 20 mounted on the current brush carriage 15 and adapted to ride on the rail by means such as wheels 21. A plurality of induction coils 22, 22' are mounted within the detector carriage 20, said coils being positioned as shown in Fig. 4 with their axes crosswise of the rail so as to cut the lines of force surrounding the rail as the car moves along the tracks. It will be seen that on entering a region of flaw the forward coil of the pair of coils 22 which are connected in opposition will cut a different number of lines of force from the rear coil to set up a differential E. M. F. which may be amplified and caused to operate an indicator or recorder (not shown).

The reason for this invention is shown in Figs. 1 and 2. In Fig. 1 it will be seen that a small flaw F causes a very sudden variation V in the electromagnetic field E in the region of flaw. So that when the forward coil of a pair of induction coils enters this region there is a very sharp difference between the E. M. F. which the forward coil generates and the E. M. F. which the rear coil generates. Thus, a substantial differential E. M. F. is generated which after being amplified is sufficient to operate the indicator. In the case of a very large fissure F' or one that has actually cracked out, the result is as shown in Fig. 2, namely, a very gradual distortion V' of the electromagnetic field extending on both sides of the fissure to a considerable distance so that the forward coil of a pair of induction coils is cutting only a very slightly different number of lines of force than the rearward coil, and hence the differential E. M. F. generated is so slight that even after being amplified it is not sufficient to operate the indicating mechanism. One form of my invention, shown in Figs. 3 to 6 inclusive, comprises an induction coil 30, carried by the detector carriage in which the coils 22 and 22' are mounted, but positioned with its axis substantially parallel to the longitudinal axis of the rail and substantially parallel to the direction of current flow. As a result of this construction, the coil 30 is not responsive to the electromagnetic field surrounding the rail because the lines of force of said field are in the same plane as the turns of said coils and therefore here is no cutting of lines of force. We take advantage of the fact that where there is a very large fissure, or even a cracked-out fissure, the faces of said fissure form magnetic poles, one face being a north pole and the other face a south pole, and lines of flux travel directly from one face to the other in lines substantially parallel to the longitudinal axis of the rail. When the coil 30 encounters these lines of flux it will cut them and an E. M. F. will be generated. This E. M. F. may be suitably amplified by the same amplifier as is employed for coils 22 and 22' to operate the indicator. It will be noted that I mount the coil 30 in advance of the coils 22, 22'. One advantageous result which I derive from such construction is as follows: On approaching an angle-bar, such as bar B connecting two rails R, R' (see Fig. 4), it is necessary to cut out the action of coils 22, 22' because the electromagnetic field is displaced for a distance of several inches in advance of the angle-bar and therefore the leading coil 22, for instance, would strike this deflected field and cause an indication like that of a flaw to be set up. It is therefore necessary to provide cutouts 39 (Fig. 3) in advance of coil 22 which render the action of coils 22 and 22' in-22 effective to actuate the fissure pens on the recorder for a predetermined distance in advance of the angle-bar, (as fully described in my Patent No. 1,912,569 granted June 6, 1933). It sometimes happened, however, that large and cracked-out fissures occurred within this space in advance of the angle-bar which was not tested. By mounting coil 30 in advance of coils 22 and 22' it will be seen that coil 30 will have tested substantially up to the joint J before the cutout becomes effective. Thus, in Fig. 4, it will be seen that coil 30 has substantially reached the joint J while the leading coil 22 is in the position where the cutout normally becomes effective. The deflection of the field due to angle-bar B which makes it necessary to cut out the action of coils 22 and 22' does not affect coil 30 which has its axis at right angles to the axis of coils 22 and 22' and is not affected by the electromagnetic field surrounding the rail. Any large fissure within the portion of the rail ordinarily not tested by the coils 22 and 22' would be picked up by coil 30.

Similarly, on leaving the angle-bar after passing on to rail R', a certain distance after the angle-bar must be allowed before the coils 22, 22' can be rendered effective again, because the same deflection exists beyond the other end of angle-bar B as in advance of the forward end. Therefore, I provide, in the Fig. 4 form, an additional coil 30' similar to coil 30 at the rear end of the detector carriage and extending beyond the rear coil 22' so that said coil 30' will test that portion of rail R' between the joint and the point where the coils 22' are rendered effective, which portion of the rail was heretofore not tested. When two such coils are used they may be interconnected, as shown in Fig. 5, for example.

The coil 30 is capable of detecting ordinary fissures as well as large or cracked-out fissures. As hereinbefore stated, the electromagnetic field surrounding the conductor (in this case, the rail) does not affect coil 30. The core 40 of the coil 30 is formed with pole-pieces 41, 42 spaced longitudinally along the rail and form, with the portion of the rail between the spaced poles, a magnetic circuit. Normally, no flux travels through this circuit by reason of the fact that the electromagnetic field surrounding the rail is transverse of the rail. When a flaw is present, the field is deflected so as to create a longitudinal component thereof which establishes flux between the pole-pieces 41, 42, and therefore through the magnetic circuit and through coil 30. If a coil 30' is employed, a similar core 40' with pole-pieces 41' and 42' may be provided.

It may be desirable to provide pairs of coils 30, 31 in place of a single coil 30 to coact with respective portions of the rail head, since it has been found that even when a large flaw occurs the diminution of flux at one side is compensated for by increase of flux at the other side, so that the total gives the same result as if no flaw were present. By providing two coils 30, 31 in place of one coil, each coil coacting with a respective side of the rail, such addition or integration is not possible. If desired, a pair of rear coils 30', 31' may be employed and these coils may be suitably interconnected, as, for instance, shown in Fig. 6.

In the wiring diagram of Fig. 7 I have disclosed the connections between the various induction coils. It will be seen that all of them connect with the amplifier A so that the induced voltages are suitably amplified and the output of the amplifier is caused to operate any suitable indicator.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a rail flaw detector mechanism, means for sending current through the rail to establish an electromagnetic field surrounding the same and means for detecting flaws in the rail, said last-named means including inductive means positioned with its axis spaced from the axis of the rail and substantially parallel to the direction of current flow.

2. In a rail flaw detector mechanism, means for sending current through the rail to establish an electromagnetic field surrounding the same and means for detecting flaws in the rail, said last-named means including inductive means positioned with its axis substantially parallel to the direction of current flow other inductive means positioned with its axis at an angle to the direction of current flow, and means responsive to induced voltages in said plurality of inductive means.

3. In a rail flaw detector mechanism, means for sending current through the rail to establish an electromagnetic field surrounding the same and means for detecting flaws in the rail, said last-named means including inductive means positioned with its axis at an angle to the direction of current flow, other inductive means positioned with its axis substantially parallel to the direction of current flow in advance of said first inductive means, and means responsive to induced voltages in said plurality of inductive means.

4. In a rail flaw detector mechanism, means for sending current through the rail to establish an electromagnetic field surrounding the same and means for detecting flaws in the rail, said last-named means including inductive means positioned with its axis at an angle to the direction of current flow, a plurality of other inductive means positioned with their axes substantially parallel to the direction of current flow in advance and to the rear of said first inductive means, and means responsive to induced voltages in said plurality of inductive means.

5. In a rail flaw detector mechanism, means for sending current through the rail to establish an electromagnetic field surrounding the same and means for detecting flaws in the rail, said last-named means including a plurality of inductive means spaced with respect to each other laterally across the rail, each of said inductive means being positioned with its axis substantially parallel to the direction of current flow.

6. In a rail flaw detector mechanism, means for sending current through the rail to establish an electromagnetic field surrounding the same and means for detecting flaws in the rail, said last-named means including a plurality of inductive means spaced along the rail, each of said inductive means being positioned with its axis substantially parallel to the direction of current flow.

7. In a rail flaw detector mechanism, means for sending current through the rail to establish an electromagnetic field surrounding the same and means for detecting flaws in the rail, said last-named means including a plurality of sets of inductive means, the inductive means of each set being spaced along the rail and said sets being spaced with respect to each other laterally across the rail, each of said inductive means being positioned with its axis substantially parallel to the direction of current flow.

8. In a detector mechanism for detecting flaws in rails joined by angle-bars to form a continuous rail, means for sending current through the rail to establish an electromagnetic field surrounding the same, and means for detecting flaws in the rail, said last-named means comprising inductive means positioned with its axis at an angle to the direction of current flow, joint cut-out means for rendering said inductive means ineffective a predetermined distance in advance and to the rear of said angle-bars, and other inductive means positioned with its axis substantially parallel to the direction of current flow in advance of said first inductive means.

9. In a detector mechanism for detecting flaws in rails joined by angle-bars to form a continuous rail, means for sending current through the rail to establish an electromagnetic field surrounding the same, and means for detecting flaws in the rail, said last-named means comprising inductive means positioned with its axis at an angle to the direction of current flow, joint cut-out means for rendering said inductive means ineffective a predetermined distance in advance and to the rear of said angle-bars, and other inductive means positioned with its axis substantially parallel to the direction of current flow in advance of said first inductive means a predetermined distance substantially equal to the predetermined distance within which said first inductive means is ineffective.

10. In a detector mechanism for detecting flaws in rails joined by angle-bars to form a continuous rail, means for sending current through the rail to establish an electromagnetic field surrounding the same, and means for detecting flaws in the rail, said last-named means comprising inductive means positioned with its axis at an angle to the direction of current flow, joint cut-out means for rendering said inductive means ineffective a predetermined distance in advance and to the rear of said angle-bars, and a plurality of other inductive means positioned with their axes substantially parallel to the direction of current flow in advance and to the rear of said first inductive means.

11. In a detector mechanism for detecting flaws in rails joined by angle-bars to form a continuous rail, means for sending current through the rail to establish an electromagnetic field surrounding the same, and means for detecting flaws in the rail, said last-named means comprising inductive means positioned with its axis at an angle to the direction of current flow, joint cut-out means for rendering said inductive means ineffective a predetermined distance in advance and to the rear of said angle-bars, and a plurality of other inductive means positioned with their axes substantially parallel to the direction of current flow in advance and to the rear of said first inductive means predetermined distances substantially equal to the predetermined distances within which said first inductive means is ineffective.

12. In a flaw detector mechanism for electrical conductors such as rails, bars and the like, means for sending current through said conductor to establish an electromagnetic field surrounding the same, and means for detecting flaws in the rail, said last-named means comprising an inductance coil, a core extending through said coil, said core forming a magnetic circuit including the portion of the conductor between the ends of said core, said core being spaced longitudinally of the conductor whereby flux is established in said magnetic circuit only when there is a component of the electromagnetic field in a direction longitudinal of the conductor.

13. The method of detecting flaws in metallic bodies which consists in passing an electrical current through the body and then exploring the magnetic field surrounding the body with a coil having its axis maintained substantially parallel to the general direction of flow of current through the body.

14. The method of detecting flaws in elongated metallic bodies which consists in passing an electrical current longitudinally through the body and then locating nonuniformities in the magnetic field that surrounds the body by exploring with a coil having its axis maintained substantially parallel to the longitudinal axis of the body.

15. The method of detecting flaws in rails, bars, and the like which consists in passing an electrical current through the body under test, and then exploring the magnetic field surrounding the body with a coil moving parallel to and having its axis maintained parallel to the longitudinal axis of the body.

16. The method of detecting flaws in rails, bars and the like, which consists in passing an electrical current longitudinally through the body under test, and then exploring the magnetic field surrounding the body with a coil having its axis maintained parallel to the axis of the rail and having a core projecting from both ends thereof.

17. A detector for locating flaws in elongated metallic bodies through which an electrical current is flowing, said detector comprising a relatively fixed coil having its axis parallel to the longitudinal axis of the body under test, and a core for said coil.

18. The method of detecting flaws in an elongated metallic body which consists in passing an electrical current through the body and then exploring the magnetic field surrounding the body with a coil having a magnetic core, said coil and core being arranged so that the latter is normally magnetized only to the extent that relatively small changes in magneto-motive force produce relatively large changes in magnetic flux through the core.

19. A detector for locating flaws in elongated metallic bodies through which an electrical current is flowing, said detector including a relatively fixed coil having a core provided with a plurality of downwardly extending legs, said coil being substantially parallel to the longitudinal axis of the body.

20. In a rail flaw detector mechanism, means for sending current through the rail longitudinally thereof to establish an electromagnetic field surrounding the rail, and means for detecting flaws in the rail, said last-named means including inductive means positioned so as to utilize the component of electromagnetic flux longitudinal of the rail.

21. In a rail flaw detector mechanism, means for sending current through the rail longitudinally thereof to establish an electromagnetic field surrounding the rail, and means for detecting flaws in the rail, said last-named means including inductive means positioned with its axis in the same plane with the axis of the rail.

HARCOURT C. DRAKE.